(12) United States Patent
Kondo et al.

(10) Patent No.: US 9,581,775 B2
(45) Date of Patent: Feb. 28, 2017

(54) OPTICAL RECEPTACLE

(71) Applicant: TOTO LTD., Kitakyushu-shi, Fukuoka (JP)

(72) Inventors: Sho Kondo, Fukuoka-ken (JP); Hirotsugu Agatsuma, Fukuoka-ken (JP); Satoshi Hakozaki, Fukuoka-ken (JP); Satoshi Kaneyuki, Fukuoka-ken (JP)

(73) Assignee: Toto Ltd., Fukuoka (JP)

( * ) Notice: Subject to any disclaimer, the term of this patent is extended or adjusted under 35 U.S.C. 154(b) by 0 days.

(21) Appl. No.: 14/697,867

(22) Filed: Apr. 28, 2015

(65) Prior Publication Data

US 2015/0316727 A1 Nov. 5, 2015

(30) Foreign Application Priority Data

Apr. 30, 2014 (JP) .................................. 2014-093631
Jun. 27, 2014 (JP) .................................. 2014-133204

(51) Int. Cl.
*G02B 6/42* (2006.01)
*G02B 6/38* (2006.01)

(52) U.S. Cl.
CPC ......... *G02B 6/4292* (2013.01); *G02B 6/3822* (2013.01); *G02B 6/3826* (2013.01);
(Continued)

(58) Field of Classification Search
CPC .. G02B 6/3846; G02B 6/3826; G02B 6/3855; G02B 6/3869; G02B 6/4292; G02B 6/3822; G02B 6/3851; G02B 6/421
See application file for complete search history.

(56) References Cited

U.S. PATENT DOCUMENTS 5,082,378 A * 1/1992 Muller .................. B24B 19/226
   385/70
5,214,730 A * 5/1993 Nagasawa ............ G02B 6/3821
   385/59
(Continued)

FOREIGN PATENT DOCUMENTS

JP   S63146008 A   6/1988
JP   H07124855 A   5/1995
(Continued)

OTHER PUBLICATIONS

Japanese Office Action issued Sep. 24, 2014 in the counterpart Japanese Patent Application No. 2014-133204 with English translation.
(Continued)

*Primary Examiner* — Peter Radkowski
(74) *Attorney, Agent, or Firm* — Carrier Blackman & Associates, P.C.; Jospeh P. Carrier; William D. Blackman

(57) ABSTRACT

According to one embodiment, an optical receptacle includes a fiber stub including an optical fiber, and a ferrule having a through-hole through which the optical fiber is fixed; a sleeve holding a portion of the fiber stub; a holder holding a portion of the fiber stub on an opposite side to a side that is held by the sleeve; an accommodation unit accommodates at least a portion of the fiber stub and the sleeve, an end surface of the fiber stub being formed as a convex spherical surface inclined with a specific angle with respect to a plane that is orthogonal to a center axis of the optical fiber, the end surface being optically connected to a plug ferrule to be inserted into the sleeve, the holder being provided with a positioning unit controlling an inclined direction of the end surface of the fiber stub.

13 Claims, 7 Drawing Sheets

| θ (°) | 180 | 135 | 90 | 45 | 0 |
|---|---|---|---|---|---|
| Dev (um) | 0.2928 | 0.3187 | 0.2424 | 0.1948 | 0.1339 |

(52) U.S. Cl.
CPC ......... *G02B 6/3846* (2013.01); *G02B 6/3851* (2013.01); *G02B 6/3855* (2013.01); *G02B 6/3869* (2013.01); *G02B 6/421* (2013.01)

(56) References Cited

U.S. PATENT DOCUMENTS

| | | | | |
|---|---|---|---|---|
| 5,245,684 A * | 9/1993 | Terao | ................. | B24B 19/226 385/78 |
| 5,432,880 A * | 7/1995 | Diner | ................. | B24B 19/226 385/79 |
| 6,012,852 A * | 1/2000 | Kadar-Kallen | ......... | G02B 6/32 385/74 |
| 6,126,519 A * | 10/2000 | Minami | ................. | B24B 19/226 451/41 |
| 6,416,236 B1 * | 7/2002 | Childers | ............. | G02B 6/3835 385/84 |
| 6,540,411 B1 * | 4/2003 | Cheng | ................. | G02B 6/262 385/79 |
| 6,760,516 B2 * | 7/2004 | Brun | ................. | G02B 6/29364 385/31 |
| 6,804,436 B2 * | 10/2004 | Healy | ................. | G02B 6/4206 385/33 |
| 6,877,909 B2 * | 4/2005 | Fleenor | ................. | B24B 19/226 385/78 |
| 6,899,466 B2 * | 5/2005 | Manning | ............. | G02B 6/3833 385/147 |
| H002141 H * | 1/2006 | Kevern | ........................ | 385/55 |
| 2002/0081067 A1 * | 6/2002 | Brun | ................. | G02B 6/29364 385/34 |
| 2003/0118283 A1 * | 6/2003 | Healy | ................. | G02B 6/4206 385/33 |
| 2004/0120654 A1 * | 6/2004 | Kevern | ................. | G02B 6/3885 385/78 |
| 2004/0179788 A1 * | 9/2004 | Fleenor | ................. | B24B 19/226 385/79 |
| 2004/0234204 A1 * | 11/2004 | Brun | ................. | G02B 6/29364 385/39 |
| 2004/0252952 A1 * | 12/2004 | Ayliffe | ................. | G02B 6/32 385/92 |
| 2005/0180702 A1 * | 8/2005 | Kevern | ............... | G02B 6/3885 385/93 |
| 2008/0013894 A1 * | 1/2008 | Aoki | ..................... | G02B 6/421 385/88 |
| 2008/0019642 A1 * | 1/2008 | Kewitsch | ............. | G02B 6/3825 385/72 |
| 2008/0145000 A1 * | 6/2008 | Tamada | ................ | G02B 6/3877 385/58 |
| 2009/0263082 A1 * | 10/2009 | Sasada | ................. | G02B 6/4292 385/33 |
| 2010/0210927 A1 * | 8/2010 | Gillies | ................. | A61B 5/0071 600/317 |
| 2011/0026884 A1 * | 2/2011 | Hikosaka | ............. | G02B 6/3822 385/72 |
| 2012/0288235 A1 * | 11/2012 | Chen | .................... | G02B 6/4201 385/76 |
| 2013/0163930 A1 * | 6/2013 | Jian | ......................... | G02B 6/36 385/60 |
| 2014/0241668 A1 * | 8/2014 | Levin | ................... | G02B 6/3818 385/60 |

FOREIGN PATENT DOCUMENTS

| | | | |
|---|---|---|---|
| JP | 2000028858 A | * | 1/2000 |
| JP | 2003075679 A | * | 3/2003 |
| JP | 2004309815 A | * | 11/2004 |
| JP | 2005004167 A | * | 1/2005 |
| JP | 2005017540 A | * | 1/2005 |
| JP | 2005049588 A | * | 2/2005 |
| JP | 2005338647 A | * | 12/2005 |
| JP | 2006308907 A | * | 11/2006 |
| JP | 2007011241 A | * | 1/2007 |
| JP | 2007-079422 A | | 3/2007 |
| JP | 2007079422 A | * | 3/2007 |
| JP | 2007133225 A | * | 5/2007 |
| JP | 2007163548 A | * | 6/2007 |
| JP | 2007171545 A | * | 7/2007 |
| JP | 2009162942 A | * | 7/2009 |
| JP | 2012078468 A | * | 4/2012 |
| JP | 2012078486 A | * | 4/2012 |

OTHER PUBLICATIONS

JIS C5963: 2001, "General rules of connectors with optical fiber cables".

* cited by examiner

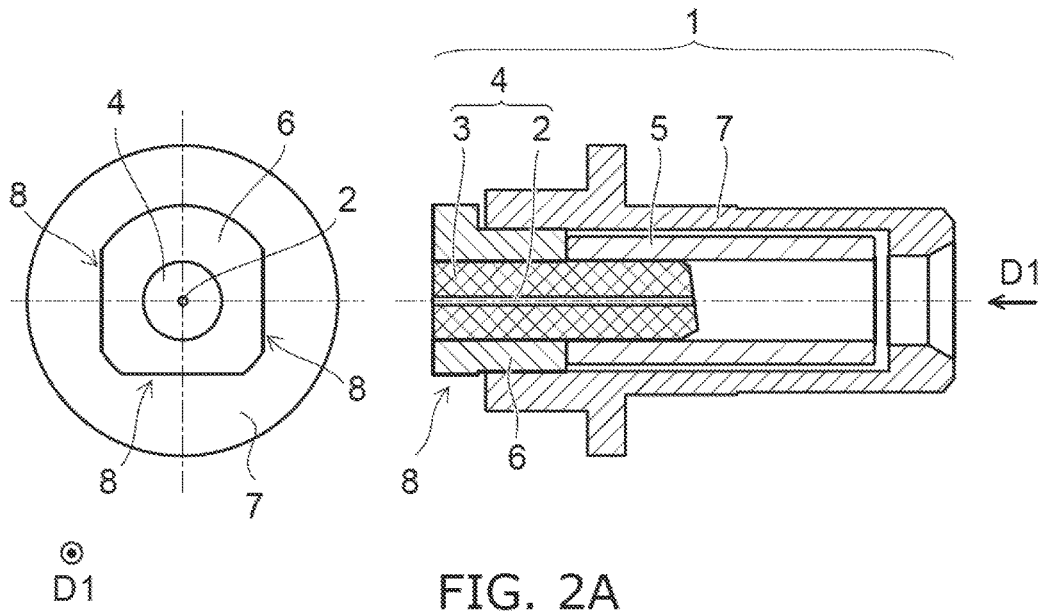
FIG. 2A
| STRUCTURE | REFLECTION DETERMINATION RESULT AT OPTICAL CONNECTION POINT |
|---|---|
| NO POSITIONING UNIT | EXMINATION PASS 18 OUT OF 30 : PASS RATE 60% |
| POSITIONING UNIT AT 1 POSITION | EXMINATION PASS 25 OUT OF 30 : PASS RATE 83% |
| POSITIONING UNITS AT 2 POSITIONS | EXMINATION PASS 30 OUT OF 30 : PASS RATE 100% |
| POSITIONING UNITS AT 3 POSITIONS | EXMINATION PASS 30 OUT OF 30 : PASS RATE 100% |
FIG. 2B
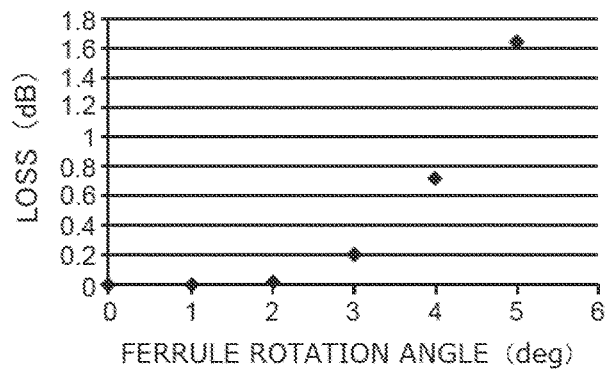
FIG. 2C

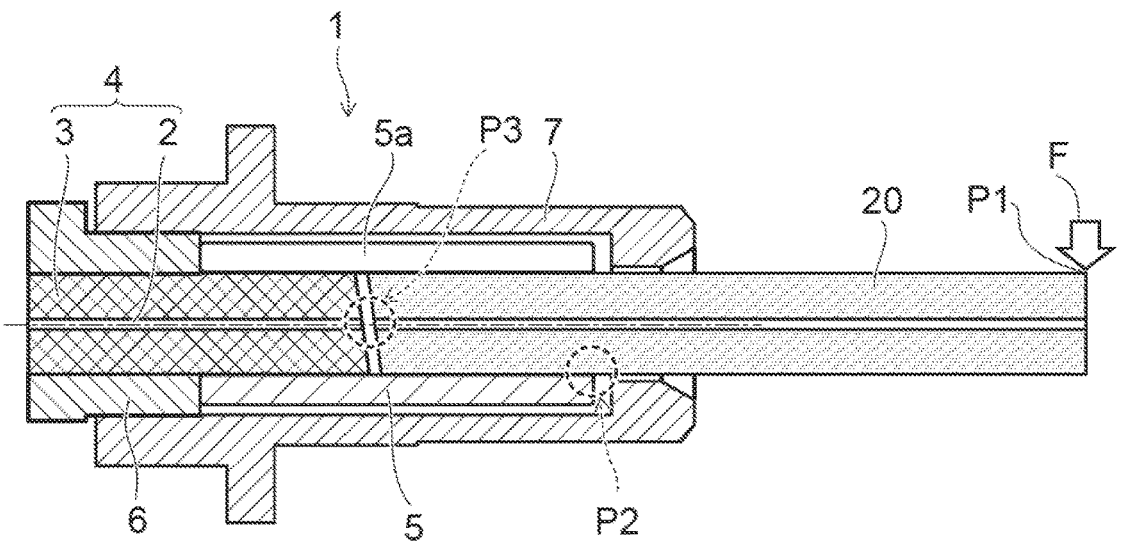
FIG. 6A
| θ (°) | 180 | 135 | 90 | 45 | 0 |
|---|---|---|---|---|---|
| Dev (um) | 0.2928 | 0.3187 | 0.2424 | 0.1948 | 0.1339 |
FIG. 6B
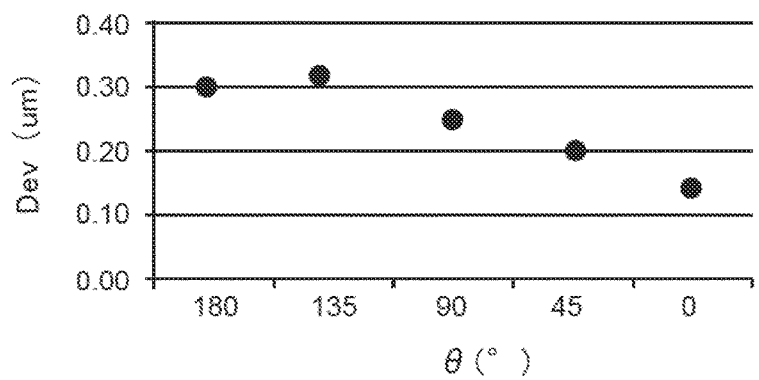
FIG. 6C

OPTICAL RECEPTACLE

CROSS-REFERENCE TO RELATED APPLICATIONS

This application is based upon and claims the benefit of priority from Japanese Patent Application No. 2014-093631, filed on Apr. 30, 2014; and Japanese Patent Application No. 2014-133204, filed on Jun. 27, 2014; the entire contents of which are incorporated herein by reference.

FIELD

Embodiments described herein relate generally to an optical transceiver module for optical communication and more specifically relates to an optical receptacle with an optical connection surface polished as an angled spherical surface.

BACKGROUND

An optical receptacle has been used as a component for optically connecting an optical fiber connector to an optical element such as a light-receiving element or a light-emitting element in an optical module of a transceiver for optical communication (see Patent Literature 1, for example)

One of the basic properties of the optical receptacle is to optically connect an optical fiber connector to an optical element as described above. In connection with an APC connector (reference literature: JIS C5963: General rules of optical connectors with optical fiber II cables) with an angled spherically polished end surface provided for the purpose of preventing reflection at an optical connecting point between an optical receptacle and an optical fiber connector, in particular, reduction of connection loss and prevention of reflection are important properties, comparing to connection with a normal PC connector.

The APC connector has been used in analog communication, in which light reflected at an optical connection point functions as noise and affects a delivered signal, in many cases.

An optical transponder was used in many cases in optical communication using analog communication in the related art. However, there has been a higher requirement for downsizing an optical communication facility with a global increase in IP traffic in recent years. In addition, an optical transceiver which is smaller and less expensive than the optical transponder has also been required for an analog communication system.

In an optical receptacle for connection with an APC connector, it is important to match a direction of angled spherical polishing to the APC connector in order to achieve an optical connection while reducing loss and reflection. However, there is no general technique with respect to a positioning method for controlling with high accuracy the direction of the angled spherical polishing for the optical receptacle in the related art, and therefore, there is a problem in that a large amount of loss or reflection occurs at the optical connection point when the optical receptacle is installed in an optical transceiver.

SUMMARY

According to an aspect of the present invention, there is provided an optical receptacle including: a fiber stub including an optical fiber including a clad and a core for optical conduction, a ferrule having a through-hole through which the optical fiber is fixed, and an elastic member filling the through-hole of the ferrule along with the optical fiber; a sleeve holding a portion of the fiber stub; a holder holding a portion of the fiber stub on an opposite side to a side that is held by the sleeve; an accommodation unit provided at a position at which the accommodation unit accommodates at least a portion of the fiber stub and the sleeve, an end surface of the fiber stub being formed as a convex spherical surface inclined with a specific angle with respect to a plane that is orthogonal to a center axis of the optical fiber, the end surface being optically connected to a plug ferrule to be inserted into the sleeve, the holder being provided with a positioning unit controlling an inclined direction of the end surface of the fiber stub.

BRIEF DESCRIPTION OF THE DRAWINGS

FIG. 2A is a cross-sectional view and a projection diagram schematically showing optical receptacles according to second and third embodiments of the invention, FIG. 2B is a table showing the relationship between the number of positioning units and the examination pass rate of reflection determination of the optical connecting portion, and FIG. 2C shows a graph showing the relationship between a loss and a size of a gap between fibers in the optical connection point;

FIG. 6A to FIG. 6C are schematic views illustrating properties of the optical receptacle;

DETAILED DESCRIPTION

Figure 1A:
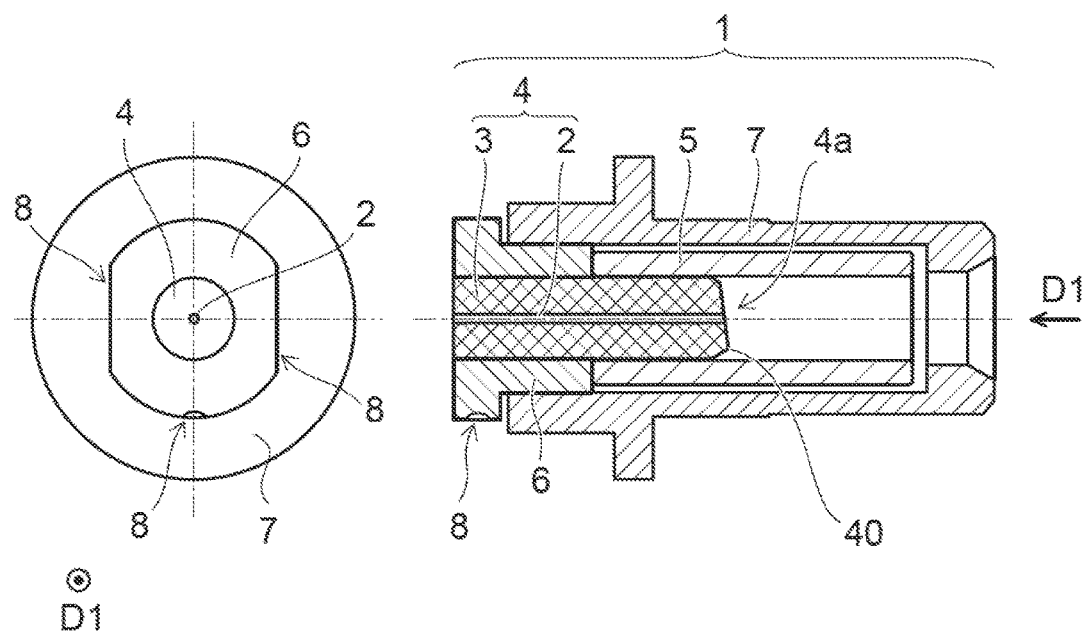
FIG. 1A and FIG. 1B are schematic views showing an optical receptacle according to a first embodiment of the invention.

A first aspect of the present invention is an optical receptacle including: a fiber stub including an optical fiber including a clad and a core for optical conduction, a ferrule having a through-hole through which the optical fiber is fixed, and an elastic member filling the through-hole of the ferrule along with the optical fiber; a sleeve holding a portion of the fiber stub; a holder holding a portion of the fiber stub on an opposite side to a side that is held by the sleeve; an accommodation unit provided at a position at which the accommodation unit accommodates at least a portion of the fiber stub and the sleeve, an end surface of the fiber stub being formed as a convex spherical surface inclined with a specific angle with respect to a plane that is orthogonal to a center axis of the optical fiber, the end surface being optically connected to a plug ferrule to be inserted into the sleeve, the holder being provided with a positioning unit controlling an inclined direction of the end surface of the fiber stub.

According to the optical receptacle, it is possible to highly precisely manage the actual direction of the angled spherical polishing by forming the angled spherical surface with reference to the positioning unit provided at the holder when the angled convex spherical surface to be optically connected to an APC connector is formed by polishing an end surface of the fiber stub, and to thereby suppress loss and reflection during the connection with the APC connector when the optical receptacle is installed in an optical transceiver.

A second aspect of the present invention is the optical receptacle according to the first aspect of the invention, wherein the holder is provided with a plurality of positioning units.

According to the optical receptacle, it is possible to highly precisely manage a positional relationship of the direction, in which the end surface of the fiber stub is actually obliquely polished, with reference to the plurality of positioning units provided in the holder when the angled convex spherical surface to be optically connected to an APC connector is formed by polishing an end surface of the fiber stub, and to thereby further suppress loss and reflection during the connection with the APC connector when the optical receptacle is installed in an optical transceiver.

A third aspect of the present invention is the optical receptacle according to the first aspect of the invention, wherein the positioning unit provided in the holder is configured of a straight line.

According to the optical receptacle, it is possible to further highly precisely manage the positioning unit and the direction of the angled polishing by using the positioning unit as a mechanical reference plane by a method of causing the straight line to abut on a jig used for polishing when the angled spherical surface is formed at the end surface of the fiber stub with reference to the positioning unit provided in the holder.

A fourth aspect of the present invention is the optical receptacle according to the first aspect of the invention, wherein the positioning unit provided in the holder is configured of a notch.

According to the optical receptacle, it is possible to enhance the accuracy of the positioning unit and the direction of the angled polishing by matching the jig used for polishing to the notch when the angled spherical surface is formed at the end surface of the fiber stub.

A fifth aspect of the present invention is the optical receptacle according to the first aspect of the invention, wherein an angle between the positioning unit provided in the holder and the direction in which the end surface of the fiber stub is inclined is within ±3° with respect to a predetermined angle.

According to the optical receptacle, it is possible to further suppress loss and reflection during the connection with the APC connector when the optical receptacle is installed in an optical transceiver by reducing apex eccentricity of the end surface of the fiber stub with respect to the positioning unit.

A sixth aspect of the present invention is the optical receptacle according to the first aspect of the invention, wherein the holder holds the portion of the fiber stub at a position away from the end surface, which is formed as a convex spherical surface inclined at a specific angle with respect to the plane that is orthogonal to the center axis of the optical fiber, by 1 mm or greater.

According to the optical receptacle, it is possible to secure a sufficiently long length to directly fix an outer circumference of the fiber stub to the jig when the end surface of the fiber stub is polished for the angled spherical surface, and to highly precisely manage the direction of the angled spherical polishing with respect to the positioning unit provided in the holder.

A seventh aspect of the present invention is the optical receptacle according to the first aspect of to sixth inventions, the spherical surface employed as the end surface of the fiber stub is formed over an entire region of the end surface of the ferrule.

According to the optical receptacle, it is possible to form an apex of the angled spherical surface provided at the end surface of the fiber stub at a position that is closer to the center axis of the angled spherical surface.

An eighth aspect of the present invention is the optical receptacle according to the first aspect of the invention, wherein the sleeve includes a slit extending parallel to a center axis of the optical fiber, the slit being provided at a portion of a circumference of the sleeve, and the slit is positioned on a side, on which a distance from the holder is shorter, in the end surface formed as the convex spherical surface inclined at a specific angle with respect to the plane that is orthogonal to the center axis of the optical fiber.

According to the optical receptacle, it is possible to suppress deviations of center axes of the fiber stub and the plug ferrule when a lateral load is applied to the plug ferrule that is inserted into the optical receptacle.

A ninth aspect of the present invention is the optical receptacle according to the eighth aspect of the invention, wherein an angle between a straight line connecting the center axis and a first point, which is the closest to the holder, among points on the end surface formed as the convex spherical surface and a straight line connecting the center of the slit and the center axis is equal to or less than 90° when viewed in a direction in parallel with the center axis.

According to the optical receptacle, it is possible to further suppress the deviation of the center axes of the fiber stub and the plug ferrule when a lateral load is applied to the plug ferrule that is inserted into the optical receptacle.

A tenth aspect of the present invention is the optical receptacle according to the first aspect of the invention, wherein a portion of an end surface, which is on an opposite side to the end surface formed as the convex spherical surface, of the fiber stub is a plane inclined with respect to the plane that is orthogonal to the center axis of the optical fiber, and an angle between a straight line connecting the center axis of the optical fiber and a point, which is the closest to the sleeve, among points on the end surface on the opposite side to the end surface formed as the convex spherical surface and a straight line connecting a reference point on the positioning unit and the center axis of the optical fiber is a predetermined angle when viewed in a direction in parallel with the center axis of the optical fiber.

According to the optical receptacle, it is possible to shorten an amount of time required for adjusting centers in production of an optical module when the optical module is produced by combining the optical receptacle and the optical element, by obliquely forming the end surface of the fiber stub on the side of an optical element and further providing a positioning unit configured to indicate the direction of the inclination of the end surface for the purpose of preventing light, which is reflected by the end surface of the optical fiber, in light emitted from the optical element from returning to the optical element. In the APC receptacle, the positioning unit can be disposed so as to indicate a direction of the inclination of the end surface on the side of the optical connection with the plug ferrule and a direction of the inclination of the end surface on the side of the optical element.

Hereinafter, embodiments of the invention will be described with reference to drawings. In the drawings, the same reference numerals are given to the same components, and detailed descriptions thereof will be appropriately omitted.

FIG. 1A is a cross-sectional view schematically showing an optical receptacle according to a first embodiment of the invention. An optical receptacle 1 includes: a fiber stub 4 including an optical fiber 2 configured to include a core and a clad for optical conduction, a ferrule 3 configured to have a through-hole through which the optical fiber is fixed, and an elastic member configured to fill the through-hole of the ferrule along with the optical fiber; a sleeve 5 configured to hold a portion of the fiber stub 4; a holder 6 configured to hold a portion of the fiber stub 4 on the opposite side to the side that is held by the sleeve; an accommodation unit 7 provided at a position at which the accommodation unit 7 accommodates at least a portion of the fiber stub 4 and the sleeve 5. An end surface 4a (first end surface) of the fiber stub 4 is formed as a convex spherical surface inclined with a specific angle with respect to a plane that is orthogonal to a center axis of the optical fiber 2, and the holder 6 is provided with positioning units 8 at not less than two positions. Here, the elastic member is not shown in the drawing.

Examples of a material suitable for the ferrule 3 include ceramics and glass. In the example, zirconia ceramic is used, an optical fiber 2 is bonded and fixed to the center thereof, and an end surface 4a is formed by polishing the material so as to obtain a convex spherical surface inclined at a specific angle with respect to a plane that is orthogonal to the center axis of the optical fiber 2. That is, a convex surface is provided on the plane which is inclined with respect to the plane that is orthogonal to the center axis of the optical fiber 2. In addition, another end surface (second end surface) of the fiber stub 4 on the opposite side to the end surface 4a is also polished and formed into a plane. Although the second end surface is formed as a plane that is orthogonal to the center axis of the optical fiber 2 in the example, the second end surface may be obliquely polished.

In the example, the fiber stub 4, the holder 6, the accommodation unit 7, and the like are fixed by press-fitting in the assembly of the optical receptacle 1.

Examples of a material suitable for the sleeve 5 include metal and ceramics. In the example, a split sleeve made of zirconia ceramic which has a slit in the entire length direction is used. The sleeve 5 is configured such that a tip end portion including the end surface 4a, which is polished into an angled convex spherical surface, of the fiber stub 4 is held at one end thereof and a plug ferrule to be inserted into the optical receptacle 1 is held at the other end. In addition, the plug ferrule is not shown in the drawing.

The end surface 4a, which is optically connected to the plug ferrule to be inserted into the sleeve 5, in the end surfaces of the fiber stub 4 is formed as a convex spherical surface inclined at a specific angle with respect to the plane that is orthogonal to the center axis of the optical fiber. The specific angle described herein is desirably equal to or less than 8°±0.5° in terms of satisfactory connection with a typical APC connector (reference literature: JIS C5963: General rules of optical connectors with optical fiber II cables).

The holder 6 configured to hold a portion of the fiber stub 4 is provided with positioning units 8 at two positions, which control a direction in which the end surface 4a of the fiber stub 4 is obliquely polished. Furthermore, the positioning unit 8 is added to the holder 6 at one position. The added positioning unit 8 may be used to show the direction in which the end surface 4a of the fiber stub 4 is polished. While the shape of the added positioning unit 8 may be similar to the shape of two positioning units 8 used for controlling the direction obliquely polished, it is replaceable by a mark formed by using a magic pen, ink, and a laser marker or the like and a general irregularity or the like. As a method of forming the positioning unit 8, it is considered to use a magic pen, ink, a laser marker, mechanical convexities and concavities, and the like. As shown, the positioning units 8 may be provided on an outer end portion of the holder 6 which is not fitted in the accommodation unit 7, and do not function to prevent the holder 6 and the accommodation unit 7 from moving relative to each other.

In general, when the end surface 4a, which is optically connected to the plug ferrule, of the fiber stub 4 is polished and formed, the polishing is performed while the fiber stub 4 is fixed to a jig which has a strictly managed shape and dimensions in order to obtain a desired shape of the end surface. When the fiber stub 4 is fixed to the jig, the fiber stub 4 is typically fixed while an outer circumference of the ferrule 3 is arranged along the jig.

In the example, the end surface 4a is formed after fixing the fiber stub 4 such that a direction with respect to the positioning unit provided in advance in the holder 6 is within a predetermined range when the fiber stub 4 is fixed to the jig in order to form the angled spherical end surface 4a of the fiber stub 4 to be used in the optical receptacle 1. At this time, it is possible to highly precisely manage the positions of the positioning unit 8 and the end surface 4a of the fiber stub 4 with reference to the positioning units 8 provided at two or more positions in the holder 6 which is directly press-fitted and fixed to the fiber stub 4. The positional relationship of the positioning units 8 at two positions can be set appropriately by a person skilled in the art. In the example, the positional relationship between the two poisoning units 8 is set to be parallel. However, the positioning units 8 may be, for example, orthogonal mutually.

By highly precisely managing the direction of the inclination of the convex spherical end surface 4a, which is inclined at a specific angle with respect to the plane that is orthogonal to the center axis of the optical fiber 2, of the fiber stub 4 relative to the positioning unit 8, it is possible to reduce loss and reflection at an optical connection point when the optical receptacle 1 is installed in an optical transceiver module and is connected to an APC connector.

According to a typical APC connector, a standard requires that a position of an apex of a convex spherical surface is located within a range of equal to or less than 50 μm from the center of the end surface in a state in which the end surface on an angled convex spherical surface is observed in the vertical direction with reference to a guide key that indicates a direction of the angled polishing performed on the end surface of the optical ferrule (reference literature: JIS C5963: General rules of optical connectors with optical fiber II cables).

Configuration is made such that an angle between the positioning unit 8 provided in the holder 6 and the direction in which the end surface 4a of the fiber stub 4 is inclined with respect to the plane that is orthogonal to the center axis of the optical fiber 2 is within a range of ±3° or less with respect to a desired angle. In so doing, it is possible to set apex eccentricity of the end surface 4a on the convex spherical surface to be equal to or less than 50 μm. In the example, the desired angle is assumed to be 0°, however this angle may be, for example, one selected from 45°, 89°, 135°, 180°, 225°, 270°, and 315°.

A basis for preferable precision of 30° is as follows. It has been known that if the fiber stub and the plug ferrule rotate in the axial direction (rotate around a center axis of the optical fiber) when causing the angled spherical surfaces to contact, a gap is produced between the fibers to contact mutually. For example, if the fibers rotate by 3° in the axial direction when an angle of the spherical surface is 8° and a curvature radius of the spherical surface is 12.5 millimeters, the gap of about 0.14 millimeters is produced between the fibers. If the fibers rotate by 4° in the axial direction when an angle of the spherical surface is 8° and a curvature radius of the spherical surface is 12.5 millimeters, the gap of about 0.25 millimeters is produced. For example, if the gap is produced in the connecting portion of the fibers in the single mode fiber, a loss determined from the following formula occurs. The relationship between the rotation angle of the fiber (rotation angle of the plug ferrule to the fiber stub: ferrule rotation angle) and the loss is shown in FIG. 2C.

$$L(dB) = -10 \log(1/(1+z^2))$$

$$z = \lambda S/(2\pi n_c w^2)$$

Here, $\lambda$ is a wavelength, $n_c$ is a refractive index of the clad, w is a spot diameter of the fiber. In the embodiment, the wavelength is set to be 1310 nanometers, the refractive index of the clad is set to be 1.45, and the spot diameter is set to be 9.2 micrometers. According to the formula, the size of the gap is about 0.14 mm when the fiber rotates by 3°, and the loss is about 0.23 dB. When the rotation angle of the fiber is 4°, the size of the gap is about 0.25 mm, the loss is about 0.7 dB, and the loss increases by nearly 3 times. In general, the loss of the fiber connection is necessary to be suppressed not more than 0.5 dB. Thereby, the fiber stub having 4° shifted is not practically suitable. Therefore, an angle error is favorable to be within ±30.

Figure 1B:
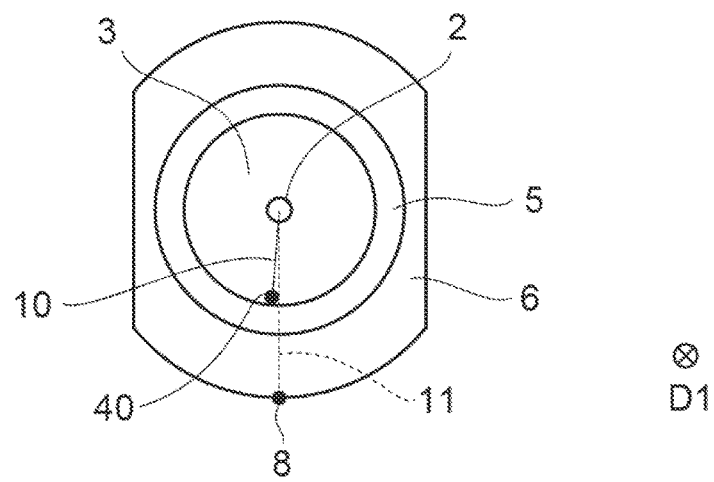

FIG. 1B is a projection diagram illustrating the optical receptacle according to the first embodiment. For clarity, a part of components is omitted. An angle between a straight line 10 and a straight line 11 when viewed from a first direction D1 that is parallel with the center axis of the optical fiber 2 is equal to or less than the desired angle ±3°. Here, the straight line 10 is a line connecting a point 40 and the center axis of the optical fiber 2. The point 40 is a point, which is located at the furthest position from the holder 6, among a plurality of points on the end surface 4a. The straight line 11 is a line connecting the center axis of the optical fiber 2 and a reference point on the positioning unit 8. The reference point is a point indicating a position of the positioning unit 8, and an arbitrary point on the positioning unit 8 can be used. The direction in which the end surface 4a of the fiber stub 4 is inclined is a direction along the straight line 10, for example.

By using the aforementioned positioning unit 8 as a guide key that indicates the direction in which the end surface 4a is obliquely polished, when the optical receptacle 1 is installed in the optical transceiver module, it is possible to reliably connect fibers in the connection with the APC connector and to thereby reduce loss and reflection at the optical connection point.

FIG. 2A is a cross-sectional view and a projection diagram schematically showing optical receptacles according to second and third embodiments of the invention. Members configuring the optical receptacle 1 are the same as those in the first embodiment, and respective positioning units at 3 positions which are provided in the holder 6 to indicate the inclination direction of the end surface 4a of the fiber stub 4 are configured by straight lines.

That is, the optical receptacle 1 further includes a second positioning unit which indicates the inclination direction of the end surface 4a of the fiber stub 4. The respective shapes of the positioning units at 3 positions when viewed along the first direction D1 that is parallel with the center axis of the optical fiber 2 (when projected to the plane that is orthogonal to the center axis) are straight lines.

By providing the positioning units 8 at 3 positions, it becomes possible to further precisely manage the inclination direction of the end surface 4a and the precision of the positioning units 8 when the end surface 4a of the fiber stub 4 is formed and to thereby reduce loss and reflection at the optical connection point during the connection with the APC connector.

In these examples, the positioning units 8 are configured by D-cut of straight lines provided in three directions. With such a configuration, it is possible to fix the positions of the holder 6 and the fiber stub 4 in the three directions when the fiber stub 4 is fixed to the polishing jig and to thereby further precisely manage the positions of the end surface 4a of the fiber stub 4 and the positioning units 8.

The straight line described herein may have any length as long as the length is long enough to be used as a reference when the fiber stub 4 and the holder 6 are fixed to the jig, and the straight line is not necessarily straight in a strict sense over the entire length thereof. For example, a portion of the line may have a spherical shape with small and large curvatures.

FIG. 2B is a table showing the relationship between the number of positioning units and the result of reflection determination of the optical connection point. In order to confirm the effect, the reflection determination has been made about each of the structure having no positioning unit and the structure having the positioning units at 1 to 3 positions.

The reflection determination of the optical connection point is made by using a high resolution reflectometer. In this reflection determination, the examination pass value of the connecting portion has been set to be not less than 70 dB. No defect occurs in the structure having the positioning units at not less than 2 positions, and the effect of this invention can be confirmed.

Figure 3A:
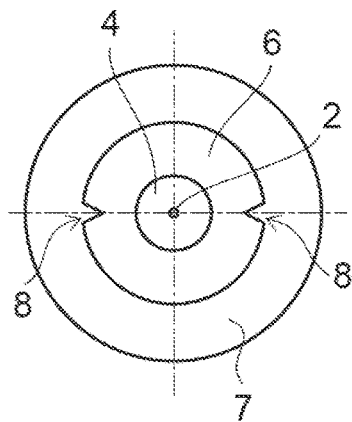
FIG. 3A to FIG. 3C are projection diagrams of an optical receptacle according to a fourth embodiment of the invention.
Figure 3B:
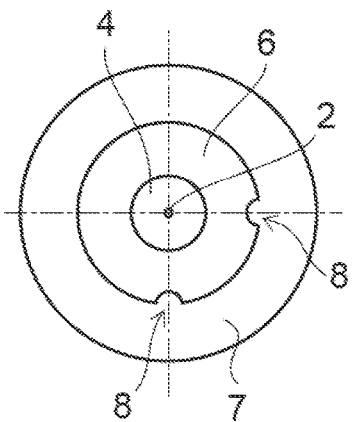
Figure 3C:
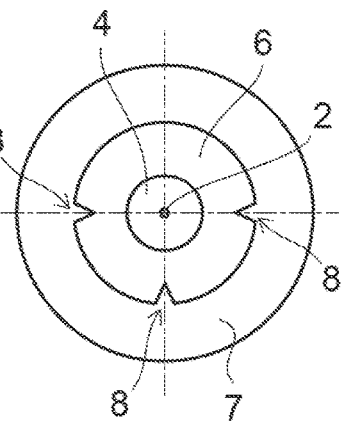

FIG. 3A to FIG. 3C are projection diagrams of an optical receptacle according to a fourth embodiment of the invention. The members configuring the optical receptacle 1 are the same as those in the first embodiment, and a positioning unit which is provided in the holder 6 to control the inclination direction of the end surface 4a of the fiber stub 4 is configured as a notch provided in the circular outer circumference of the holder 6.

By configuring the positioning unit 8 of the notch and using the notch to fix the fiber stub 4 to the polishing jig for forming the end surface 4a, it becomes possible to further precisely manage the inclination direction of the end surface 4a and the position of the positioning unit 8. In addition, it is possible to achieve further precise management by providing notched positioning units 8 at 3 positions as shown in FIG. 3C.

As a shape of the notched positioning unit 8 provided in the holder 6, a wedge shape as shown in FIG. 3A and a circular shape as shown in FIG. 3B can be considered. However, it is not necessary to limit the shape thereof as long as the function of the positioning unit can be realized. In the case in which the plurality of positioning units 8 are provided as in FIG. 3C, the shapes thereof are not necessarily the same, and the respective positioning units 8 may have different shapes. Furthermore, it is also possible to employ a combination of a notched positioning unit and a linear positioning unit when the plurality of positioning units 8 is provided.

Figure 4:
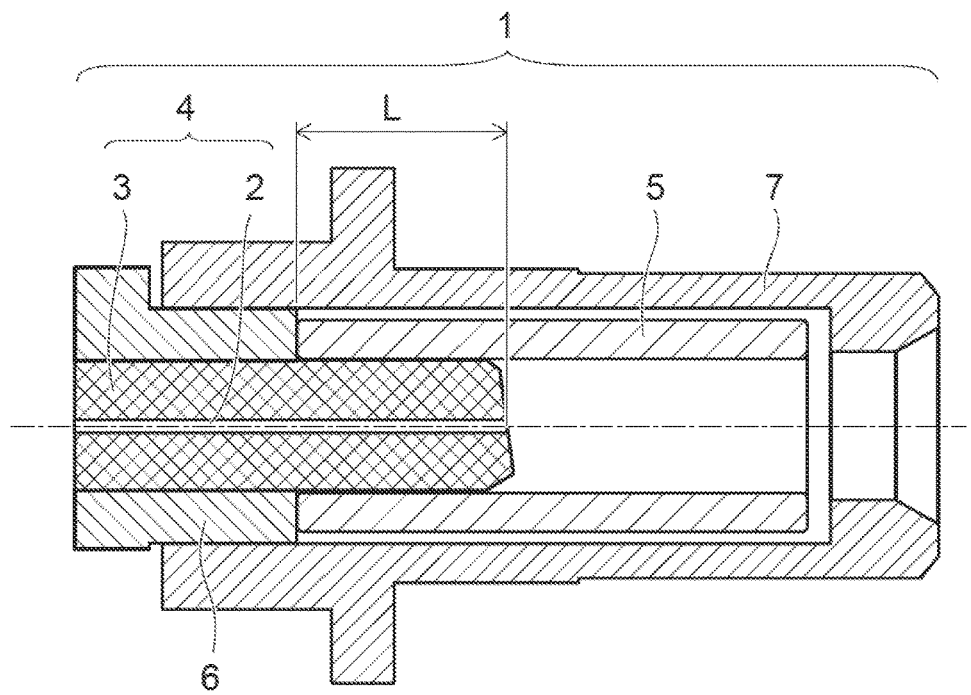
FIG. 4 is a cross-sectional view schematically showing an optical receptacle according to a fifth embodiment of the invention.

FIG. 4 is a cross-sectional view schematically showing an optical receptacle according to a fifth embodiment of the invention. The members configuring the optical receptacle 1 are the same as those in the first embodiment, and a length L from the end surface 4a of the fiber stub 4 to a position at which the holder 6 holds the fiber stub 4 is set to be equal to or greater than 1 mm.

As described above, the convex spherical end surface 4a, which is inclined at a specific angle with respect to the plane that is orthogonal to the center axis of the optical fiber 2, of the fiber stub 4 is typically formed by performing polishing, for example, in the state in which the side surfaces of the fiber stub 4 are fixed to a dedicated jig in order to obtain a shape of an end surface required for a typical optical connector. Since the ferrule 3 configuring the fiber stub 4 has an outer diameter, concentricity of the outer diameter with respect to the inner diameter, cylindricity of the outer diameter, and the like that are significantly precisely managed, it is possible to economically produce the fiber stub 4 which is required to have high precision in shape and dimensions, by fixing the fiber stub 4 to the jig with reference to the outer circumference of the ferrule 3.

Here, by locating the position, at which the holder 6 holds the fiber stub 4, at a position away from the end surface 4a of the fiber stub 4 by 1 mm or greater, it is possible to secure a sufficient length for fixing the outer circumference of the fiber stub 4 to the jig when the end surface 4a is formed. In so doing, it is possible to suppress deviations during the processing and to thereby realize the aforementioned economically efficient production.

Figure 5A:
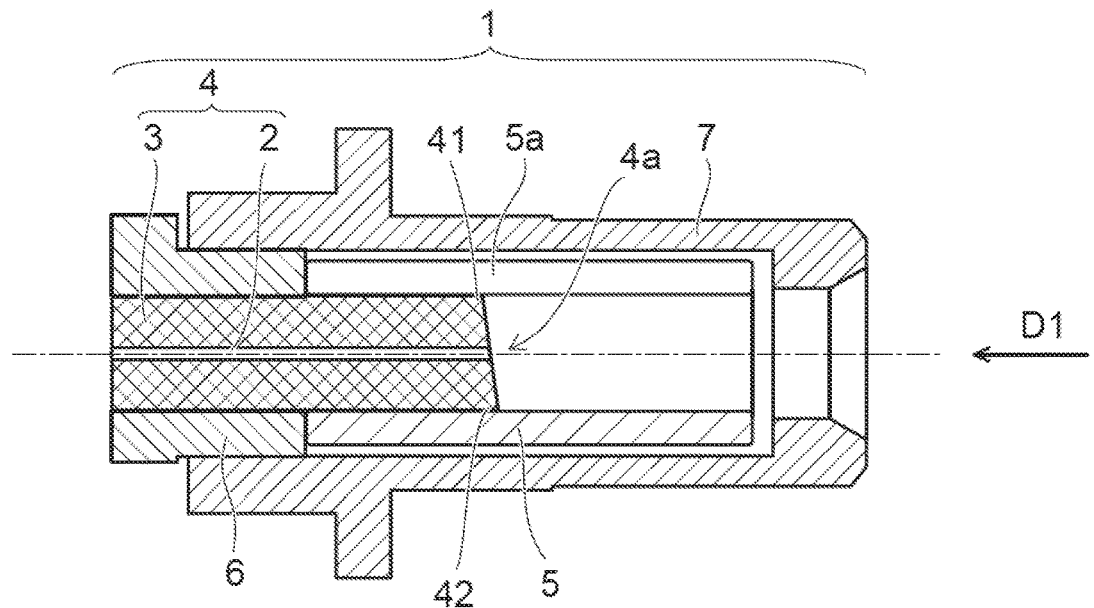
FIG. 5A and FIG. 5B are cross-sectional views schematically showing optical receptacles according to seventh and eighth embodiments of the invention.

FIG. 5A is a cross-sectional view schematically showing optical receptacles according to seventh and eighth embodiments of the invention. The members configuring the optical receptacle 1 are the same as those in the first embodiment, and the end surface 4a of the fiber stub 4 is configured over the entire end surface of the ferrule 3. That is, a diameter of the convex spherical end surface 4a when viewed from the first direction D1 that is parallel with the center axis of the optical fiber 2 is the same as the diameter of the ferrule 3. Here, the term "the same" includes a range of deviations caused in fabrication.

Furthermore, the sleeve 5 includes, at a portion of the outer circumference thereof, a slit 5a along the first direction D1 (the center axis direction) that is parallel with the center axis of the optical fiber 2. The slit 5a is arranged in the end surface 4a of the fiber stub 4 such that the slit 5a is located at the closest position to the holder 6.

Figure 5B:
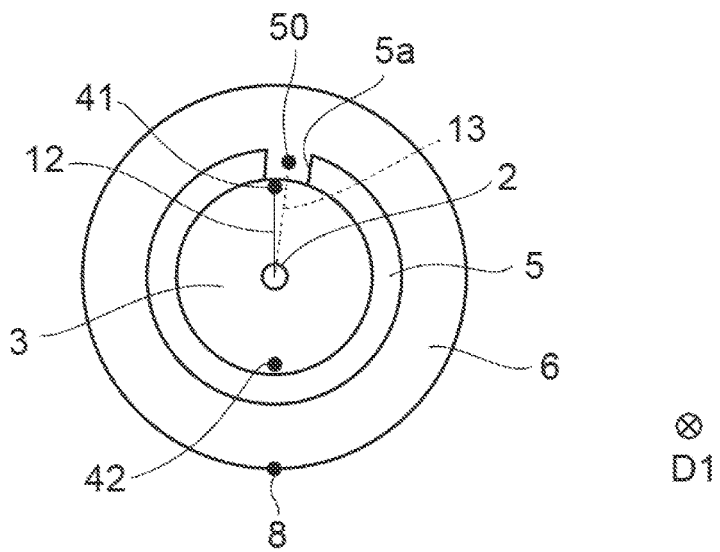

FIG. 5B is a projection diagram illustrating the optical receptacles according to the seventh and eighth embodiments. For clarity, a part of components is omitted. A first point 41 shown in FIG. 5A and FIG. 5B is the point, which is located at the closest position to the holder 6 in the first direction D1, among a plurality of points on the end surface 4a. A second point 42 is a point, which is located at the furthest position from the holder 6 in the first direction D1, among the plurality of points on the end surface 4a. A distance between the slit 5a and the first point 41 is shorter than a distance between the slit 5a and the second point 42.

In addition, the slit 5a is arranged within a range of ±90° from the position, which is closest to the holder 6, in the end surface 4a. That is, when viewed from the first direction D1, an angle between the straight line 13 connecting the center axis of the optical fiber 2 and a center 50 of the slit 5a and the straight line 12 connecting the center axis of the optical fiber 2 and the first point 41 is equal to or less than ±90°. As described above, the slit 5a is arranged on the side, on which the slit 5a is located at the closest position to the holder 6, in the end surface 4a.

By forming the end surface 4a of the fiber stub 4 over the entire end surface of the ferrule 3, the center of the end surface 4a observed in the direction that is orthogonal to the end surface 4a coincides with the center of the end surface of the ferrule 3. Therefore, it is possible to suppress the apex eccentricity of the end surface 4a formed on the convex spherical surface.

Generally, there is a wiggle loss with an optical receptacle. The wiggle loss is loss caused because a load is applied to a plug ferrule that is inserted into an optical receptacle installed in an optical transceiver module and centers of the plug ferrule and the optical receptacle at the optical connection point therebetween deviate from each other.

According to the optical receptacle on the assumption of the connection with the APC connector, the deviation between the center axes of the fiber stub 4 and the plug ferrule at the optical connection point of the plug ferrule that is inserted into the optical receptacle as described above is maximized when a force causing the tip end of the plug ferrule to deviate in the upper direction acts in the direction of the optical receptacle 1 shown in FIG. 5A. At this time, by arranging the slit 5a of the sleeve 5 at a position, at which the slit 5a is located at the closest position to the holder 6, in the end surface 4a of the fiber stub 4, it is possible to obtain such a positional relationship that deformation of the sleeve hardly occurs in a direction in which the wiggle loss can mostly easily occur in the optical receptacle 1 and to thereby effectively reduce the wiggle loss.

FIG. 6A to FIG. 6C are schematic views illustrating properties of the optical receptacle.

In the situation shown in FIG. 6A, dependency of the amount of deviation (amount of axial deviations Dev) between the center axis of the fiber stub 4 and the center axis of the plug ferrule 20 in a slit direction θ was analyzed. In the analysis, a spatial position of the accommodation unit 7 was fixed, the plug ferrule 20 was inserted into the optical receptacle 1, and a lateral load was applied to a point of effort P1. That is, the load was applied in the direction represented by the arrow F. The lateral load was set to 1.1 newtons. At this time, an axial deviation occurred at a point of action P3 while using a point P2 as a point of support.

FIG. 6B and FIG. 6C show results of the analysis. FIG. 6B and FIG. 6C show variations in the amount of axial deviations Dev (μm) when the slit direction was varied. Here, the slit direction θ (°) is the angle between the straight line 12 and the straight line 13 when viewed from the first direction D1, which was described above with reference to FIG. 5B.

When the slit direction θ was 0°, the amount of axial deviations Dev was minimized. The amount of axial deviations Dev increased in the order of the slit direction of 0°, 45°, 90°, 180°, and 135°. In addition, it was discovered that the amount of axial deviations Dev was maximized in the case in which the slit direction θ was equal to or greater than 90°. This is considered to be because the arrangement of the slit 5a at a close position to the point of support P2 caused an increase in deformation of the sleeve at the point of support P2 and thus an increase in the amount of axial deviations. In the embodiment, the slit direction is assumed to be within a range of equal to or less than ±90°. In so doing, it is possible to suppress the amount of axial deviations and to reduce the wiggle loss.

Figure 7A:
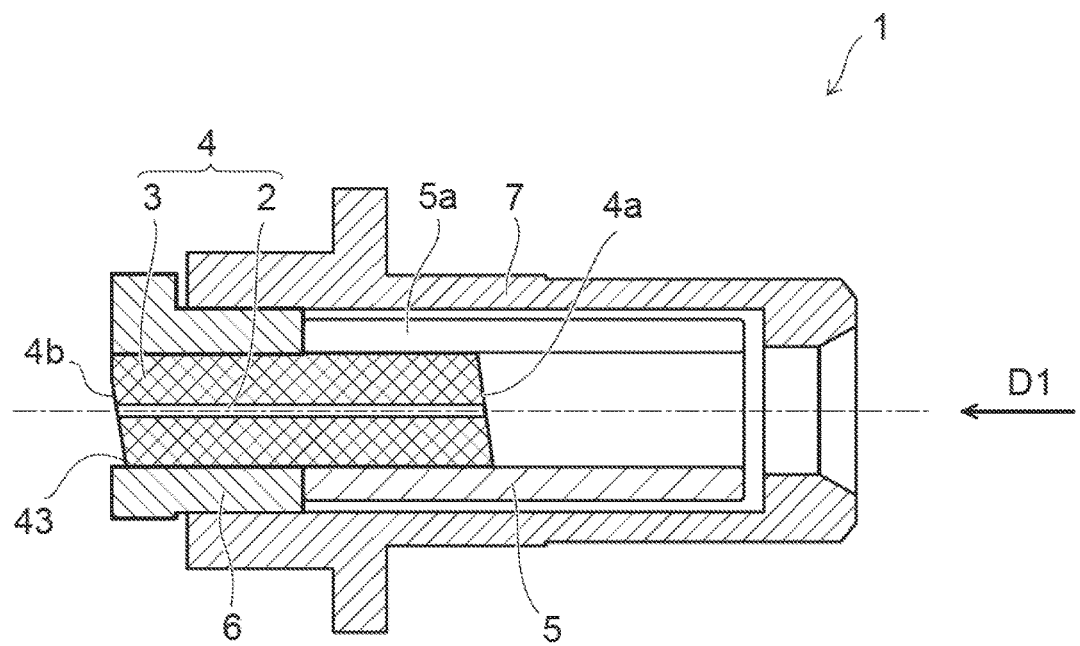
FIG. 7A and FIG. 7B are schematic views illustrating an optical receptacle according to a ninth embodiment of the invention.
Figure 7B:
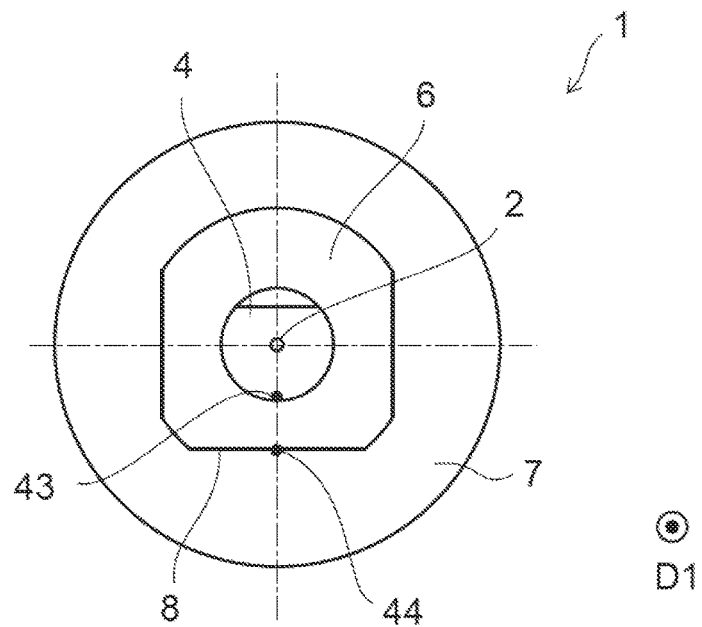

FIG. 7A is a cross-sectional view schematically showing an optical receptacle according to a ninth embodiment, and FIG. 7B is a projection view illustrating the optical receptacle according to the ninth embodiment.

The fiber stub 4 includes another end surface 4b (second end surface) on the opposite side to the end surface 4a which is formed as a convex spherical surface. A portion of the end surface 4b is a plane inclined with respect to the plane that is orthogonal to the center axis of the optical fiber 2.

The third point 43 shown in FIG. 7B is a point, which is located at the closest position to the sleeve 5, among a plurality of points on the end surface 4b. The reference point 44 is a point on the positioning unit 8 and indicates a position of the positioning unit 8. In this example, the reference point 44 is located at a center point of the positioning unit 8 in the projection view. In the case in which a notched positioning unit 8 as shown in FIG. 3A is employed, an apex of the notch may be regarded as a reference point.

An angle between the straight line connecting between the third point 43 and the center axis of the optical fiber 2 and the straight line connecting between the reference point 44 and the center axis of the optical fiber 2 is set to be a predetermined angle when viewed from the first direction D1.

As described above, the end surface (end surface 4b) of the fiber stub 4 on the side of the optical element is obliquely provided. In so doing, it is possible to prevent light, which is reflected by the end surface of the optical fiber 2, in light emitted by the optical element from returning to the optical element when the optical module is produced by combining the optical receptacle 1 and the optical element.

As described above, the positioning unit 8 that indicates the inclination direction of the end surface 4b is provided. Accordingly, it is possible to detect the inclination direction of the end surface 4b with reference to the positioning unit 8. In so doing, it is possible to shorten the time required for adjusting centers when the optical module is produced. In the APC receptacle, it is possible to dispose the positioning unit 8 so as to indicate both the inclination direction of the end surface 4a that is optically connected to the plug ferrule and the inclination direction of the end surface 4b on the side of the optical element.

Figure 8A:
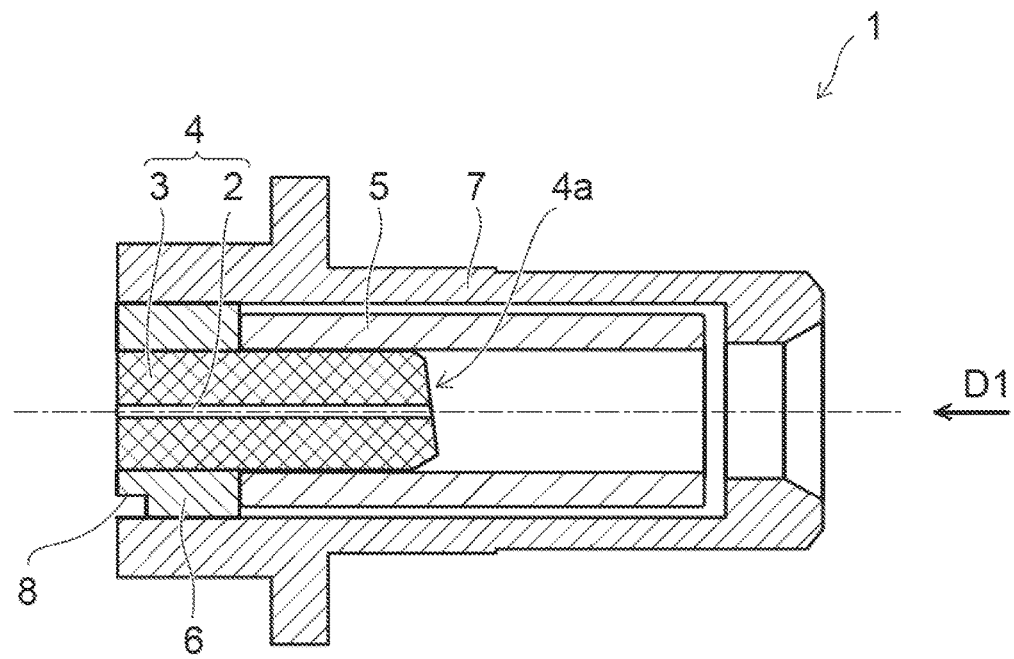
FIG. 8A and FIG. 8B are schematic views illustrating an optical receptacle according to tenth embodiment of the invention.
Figure 8B:
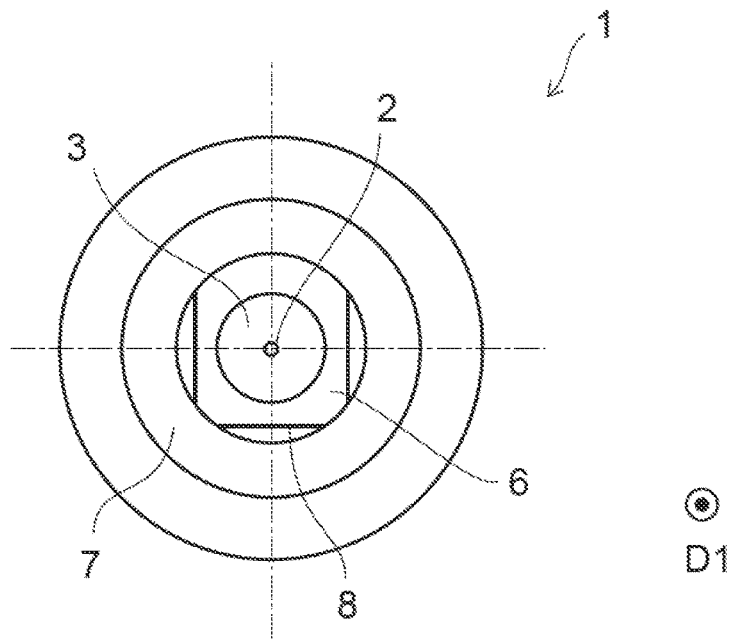

FIG. 8A is a cross-sectional view schematically illustrating an optical receptacle according to a tenth embodiment, and FIG. 8B is a projection diagram illustrating the optical receptacle according to the tenth embodiment. As shown in FIG. 8A and FIG. 8B, a part or an entirety of the positioning unit 8 may be accommodated in the accommodation unit 7. That is, at least a portion of the positioning unit 8 overlaps a portion of the accommodation unit 7 when viewed in the direction that is orthogonal to the first direction D1.

By accommodating at least a portion of the positioning unit 8 in the accommodation unit 7 as described above, it is possible to eliminate restrictions in terms of shapes after the assembly of the optical module. The positioning unit 8 can function as long as the positioning unit 8 can be visually recognized during the assembly of the optical module. In the case in which the positioning unit 8 has a shape exposed from the accommodation unit 7 as illustrated in the first to ninth embodiments, it is possible to further enhance the visibility of the positioning unit 8.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components such as the optical fiber, the ferrule, the fiber stub, the sleeve, the holder, the accommodation unit and the positioning unit, etc., from known art; and such practice is within the scope of the invention to the extent that similar effects can be obtained.

Further, any two or more components of the specific examples may be combined within the extent of technical feasibility and are included in the scope of the invention to the extent that the purport of the invention is included.

What is claimed is:

1. An optical receptacle comprising:
   a fiber stub including
     an optical fiber including a clad and a core for optical conduction,
     a ferrule having a through-hole through which the optical fiber is fixed, and
     an elastic member filling the through-hole of the ferrule along with the optical fiber;
   a sleeve holding a portion of the fiber stub;
   a holder holding a portion of the fiber stub on an opposite side to a side that is held by the sleeve; and
   an accommodation unit provided at a position at which the accommodation unit accommodates at least a portion of the fiber stub and the sleeve therein,
   an end surface of the fiber stub being formed as a convex spherical surface inclined with a specific angle with respect to a plane that is orthogonal to a center axis of the optical fiber, the end surface being configured to be optically connected to a plug ferrule to be inserted into the sleeve, and the holder being provided with a positioning unit controlling an inclined direction of the end surface of the fiber stub, and
   wherein the positioning unit does not prevent movement of the holder and the accommodation unit relative to each other.

2. The receptacle according to claim 1,
   wherein the holder is provided with more than one said positioning unit controlling an inclined direction of the end surface of the fiber stub.

3. The receptacle according to claim 1,
   wherein the positioning unit provided in the holder is configured of a straight line.

4. The receptacle according to claim 1,
   wherein the positioning unit provided in the holder is configured of a notch.

5. The receptacle according to claim 1,
   wherein an angle between the positioning unit provided in the holder and a direction in which the end surface of the fiber stub is inclined is within ±3° with respect to a predetermined angle.

6. The receptacle according to claim 1,
   wherein the holder holds the portion of the fiber stub at a position away from the end surface, which is formed as a convex spherical surface inclined at a specific angle with respect to the plane that is orthogonal to the center axis of the optical fiber, by 1 mm or greater.

7. The receptacle according to claim 1,
   wherein the convex spherical surface employed as the end surface of the fiber stub is formed over an entire region of the end surface of the ferrule.

8. The receptacle according to claim 1, wherein
the sleeve includes a slit extending parallel to a center axis of the optical fiber, the slit being provided at a portion of a circumference of the sleeve, and
the slit is positioned on a side, on which a distance from the holder is shorter, in the end surface formed as the convex spherical surface inclined at a specific angle with respect to the plane that is orthogonal to the center axis of the optical fiber.

9. The receptacle according to claim 8,
wherein an angle between a straight line connecting the center axis and a first point, which is the closest to the holder, among points on the end surface formed as the convex spherical surface and a straight line connecting a center of the slit and the center axis is equal to or less than 90° when viewed in a direction in parallel with the center axis.

10. The receptacle according to claim 1, wherein
a portion of an end surface, which is on an opposite side to the end surface formed as the convex spherical surface, of the fiber stub is a plane inclined with respect to the plane that is orthogonal to the center axis of the optical fiber, and
an angle between a straight line connecting the center axis of the optical fiber and a point, which is the closest to the sleeve, among points on the end surface on the opposite side to the end surface formed as the convex spherical surface and a straight line connecting a reference point on the positioning unit and the center axis of the optical fiber is a predetermined angle when viewed in a direction in parallel with the center axis of the optical fiber.

11. The receptacle according to claim 1, wherein the positioning unit indicates a direction in which the end surface of the fiber stub is polished as a convex spherical surface inclined with a specific angle with respect to a plane that is orthogonal to a center axis of the optical fiber.

12. The receptacle according to claim 2, wherein the holder is provided with three said positioning units controlling an inclined direction of the end surface of the fiber stub, two of said positioning units control a direction in which the end surface of the fiber stub has been polished in forming the convex spherical surface inclined with a specific angle with respect to a plane that is orthogonal to a center axis of the optical fiber, and a third of said positioning units indicates a direction in which the end surface of the fiber stub has been polished as a convex spherical surface inclined with a specific angle with respect to a plane that is orthogonal to a center axis of the optical fiber.

13. The receptacle according to claim 1, wherein the end surface of the fiber stub formed as a convex spherical surface inclined with a specific angle with respect to a plane that is orthogonal to a center axis of the optical fiber has angled physical contract (APC).

* * * * *